[8.]
HENRY G. LUDLOW. Improvement in Sliding Stop-Valves.
No. 119,378. Patented Sep. 26, 1871.
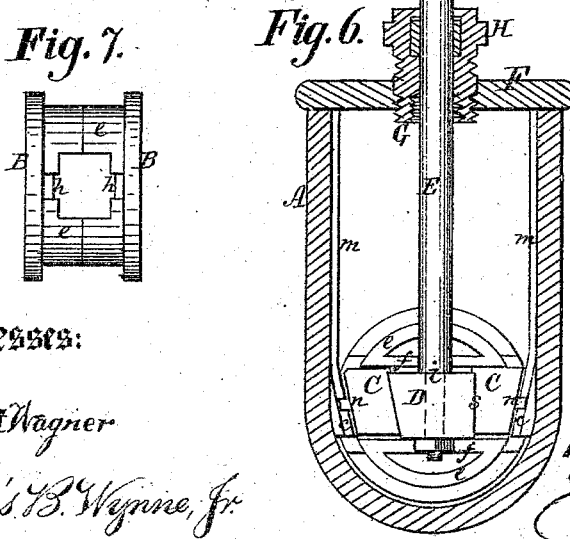

119,378

UNITED STATES PATENT OFFICE.

HENRY G. LUDLOW, OF TROY, NEW YORK.

IMPROVEMENT IN SLIDING STOP-VALVES.

Specification forming part of Letters Patent No. 119,378, dated September 26, 1871.

*To all whom it may concern:*

Be it known that I, HENRY G. LUDLOW, of Troy, in the county of Rensselaer and State of New York, have invented a new and useful Improvement in Sliding Stop-Valves, of which the following is a specification:

My invention is an improvement on the sliding stop-valve patented to me on the 10th of January, 1871; and the said improvement has for its object the easy and perfect closing of the gates against their seats after they have finished or nearly finished their downward movement in closing the valve, and the removal of the pressure or strain of the wedge pieces which press the gates against their seats before the latter commence their upward movement on being opened, so as to prevent the grinding wear or strains of the gates against their seats from this pressure. In my former patents I effected this by means of inclined, beveled, or wedge-formed surfaces on a follower upon the stem operating the gate, which surfaces, impinging against correspondingly-inclined projections on the sides of the casing, forced the gate in a lateral direction toward its seat. And I utilized a certain degree of free play of the follower back of the gate or gates, allowing the follower, with its inclined surfaces to start before the gate, in opening the valve, thus relieving the gate in a great measure from friction with the seat. These same advantages, but in a more perfect and desirable way, are obtained by my present improvement, in which, in place of the one or two inclined followers, I attain the pressing of the gates against their seats after their downward motion has been completed, or nearly completed, by independent diagonal wedge-shaped pieces moving laterally in proper ways formed on the inner sides of the gates, in combination with a double diagonal inclined central piece on the stem and fixed wedge pieces on the inner sides of the casing.

In the accompanying drawing, Figure 1 represents a sectional view of a stop-valve embracing my invention, the valve being shown as closed. Fig. 2 represents a similar view, the valve being shown as open. Fig. 3 represents a section of the same taken at right angles to that shown in Figs. 1 and 2, the valves being shown in elevation. Fig. 4 represents a horizontal section taken at the line $xx$ of Fig. 1. Fig. 5 represents a view in perspective of the two diagonal wedges, and the double diagonal inclined center piece of the operating stem.

The box or casing A of the valve is provided at the opposite sides with openings, $a\ a$, each of which is surrounded on the inside by a flat annular seat, $b$, against which the valve-gates close. The other two sides of the case are each provided with an inclined surface, $c$, these surfaces being suitably situated between the openings $a\ a$, so that they force the diagonally wedge-shaped pieces inwardly when the gates are opposite their seats so as to press the gates against said seats. The gate consists of two disks, B B, the outer surfaces of which are provided with flat rims $d\ d$ fitting snugly against the seats $b$, while on their inner surfaces they are fitted with rims $e\ e$, which are diametrically traversed by guides, $ff$, which form ways, $h$, for the diagonally wedge-shaped pieces C. On corresponding parts of the rims $e$ and guides $f$ are formed semicircular recesses $t$, Fig. 8, to receive the bearings $g$ for the stem E of the valve or gates. The inner end of this stem has turned on it a shoulder, $i$, against which impinges a double diagonal wedge-shaped piece, D, fitted between the guides $ff$ upon the smaller end of the stem, and to which wedge piece the stem is secured by means of a nut, $j$, so as to allow the end of the stem E to revolve freely in said piece D. This piece D is diagonally wedge-shaped on two sides so as to form a figure resembling a solid triangle truncated at its horizontal apex and at its vertical apex, the lines of the wedged surfaces not being parallel with the line of the motion of the stem, but at an angle to it, converging inwardly toward the inner or lower end of the stem, and the inner wedge-shaped faces of the sliding pieces C correspond with those of the piece D, while their outer ends are wedge-shaped parallel with the inclined surfaces $c$ on the casing. This diagonal wedge-shape of the faces of the piece D and of the corresponding inner faces of the pieces C allows to these pieces C not only a movement at right angles to the ways $h$ and a lateral one parallel with and in the ways $h$ as they are forced upon the incline of the beveled piece D, but also allows this latter to continue this movement of the pieces C after the gate has stopped on its downward movement and the inclined surfaces $c$ have ceased to operate the pieces C, for the piece D is not as wide as the pieces C, and, therefore, has a certain amount of free play in the line of the motion of the stem between the guides *f f* which form the ways. On beginning to close the valve the gates will usually hang of their own weight upon the upper side of the piece D, which thus remains in contact with the upper guide *f*, as shown in Fig. 2. The diagonal pieces C remain loose and free till the gates have completed, or nearly completed, their closing movement, when they (the pieces C) come in contact with the inclined surfaces *c* and are thus made to move inward upon the double-inclined piece D. By the contact of the inner diagonal inclined surfaces the outer surfaces of the two pieces C and of the piece D are made to separate, thus pressing the gates B against their seats. When the downward movement of the gates is thus arrested the piece D leaves the upper guide *f* and, impelled by stem E, goes forward till the gates B are brought firmly to their seats by the separating force of the inner diagonal wedging surfaces, as shown in Fig. 1. When commencing to open the gates B the double-inclined piece D starts first, thus relieving the gates B of the pressure of these wedging surfaces. When D again strikes the upper guide *f* the gates B commence their upward movement. The principal value of this invention lies in the diagonal shape of the wedging surfaces, by means of which this independent movement of the piece D is obtained, and by which the gates are pressed and relieved from pressure while stationary, and thus saved the friction and wear of this pressure to which they would otherwise be subject in opening and closing. The stem E passes through the cap F, sleeve G, and stuffing-box H, or equivalent devices, and may be smooth, or provided with a screw-thread, so as to be either merely depressed and raised or turned around to depress or raise the gate, and the stem is provided at its upper end with a handle for operation. Instead of two gates there may be but one, and a bar or plate in place of the second gate, against which the double-wedge piece may press, thus crowding the single gate to its seat. A modification of the operation of the pieces C and D, instead of being made diagonal, they are wedge-shaped or inclined only, and the sides of the casing and the inclined surfaces *c* are provided with a dovetailed groove or slot, in which move correspondingly dovetailed buttons on the outer beveled surfaces of the pieces C to move the wedge pieces in and out at the proper time. The buttons must, in this case, have a slight rocking or loose motion in the pieces C, or in the grooves or slots, to allow the continual horizontal position of the pieces C when the buttons move in the grooves or slots in the inclined surfaces. In using the loose wedge-shaped pieces C in either shape, the double-inclined piece can be cast with the gate instead of being attached to the stem, or may be used loose and detached from the stem. The button-and-slot modification thus described would be especially applicable and important in cases where a large valve lies on its side to prevent the upper loose wedge piece from dropping down before the proper time, as it might bind too soon with the central piece, and thus fasten the gates or spread them prematurely, making the movement less free. In place of the buttons and dovetailed slots pieces of other shapes may extend from the wedging parts C, and may, at their outer extremities, be connected with other grooves not dovetailed, to produce the same effect.

Having described my invention, I claim—

1. In a sliding stop-valve in which the gate or gates have a lateral and closing movement toward the valve-seat or seats, and in direction at right angles to that of the stem or valve-rod, the combination therewith of the triangular wedge piece D and the correspondingly-inclined wedge followers C, operating to move or crowd the gates upon their seats, when closed, by a horizontal movement.

2. In combination with a stop-valve in which the gate or gates have a lateral and closing movement toward the valve-seat or seats, and in a direction at right angles to the stem or valve-rod, the combination therewith of the triangular diagonally-wedged piece D and the correspondingly-inclined and diagonally-wedged followers C operating to tighten the gate or gates on their seat or seats when the downward movement of the latter in closing the valve has ceased, and to relieve the gate or gates of friction in the opening movement.

3. The combination of the triangular wedge piece with the wedge-shaped followers arranged to operate the gate or gates, as described, by movements at right angles to each other between guides, as described.

4. The combination in a sliding stop-valve of the fixed inclines *c*, the inclined follower C, the gate or gates B with the triangular wedge piece D and the operating stem E, constructed, arranged, and operating substantially as described.

In testimony whereof I have hereunto set my hand this 5th day of August, A. D. 1871, in the presence of two witnesses.

HENRY G. LUDLOW.

Witnesses:
 IRA E. SHATTUCK,
 BACON WHEELER.